(12) United States Patent
Kikuchi et al.

(10) Patent No.: US 8,807,641 B2
(45) Date of Patent: Aug. 19, 2014

(54) ROOF WEATHER STRIP FOR MOTOR VEHICLE

(71) Applicants: Toyoda Gosei Co., Ltd., Kiyosu (JP); Aisin Seiki Kabushiki Kaisha, Kariya (JP)

(72) Inventors: Koichi Kikuchi, Kiyosu (JP); Kazuki Sawada, Kiyosu (JP)

(73) Assignees: Toyoda Gosei Co., Ltd., Kiyosu-shi (JP); Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/846,750

(22) Filed: Mar. 18, 2013

(65) Prior Publication Data

US 2013/0249254 A1    Sep. 26, 2013

(30) Foreign Application Priority Data

Mar. 23, 2012 (JP) ................. 2012-067024

(51) Int. Cl.
*B60J 10/12* (2006.01)
*B60J 7/04* (2006.01)

(52) U.S. Cl.
CPC ...................................... *B60J 10/12* (2013.01)
USPC .................................................. 296/216.09

(58) Field of Classification Search
CPC .... B60J 10/12; B60J 10/0002; B60J 10/0005; B60J 10/0031; B60J 10/0042; B60J 10/0054; B60J 10/0062; B60J 10/0063; B60J 10/0064; B60J 10/0065; B60J 10/0068
USPC ....................................... 296/216.06–216.09
See application file for complete search history.

(56) References Cited

U.S. PATENT DOCUMENTS

| 4,738,482 | A | * | 4/1988 | Bohm et al. | 296/216.09 |
| 4,891,913 | A | * | 1/1990 | Shimura et al. | 49/493.1 |
| 5,050,928 | A | * | 9/1991 | Bohm et al. | 296/216.09 |
| 5,727,839 | A | * | 3/1998 | Ruhringer et al. | 296/213 |
| 6,286,898 | B1 | * | 9/2001 | Mori et al. | 296/216.09 |
| 6,464,293 | B2 | * | 10/2002 | Nozaki | 296/216.09 |
| 7,264,307 | B2 | * | 9/2007 | Betzl et al. | 296/216.08 |
| 8,333,427 | B2 | * | 12/2012 | Sawada | 296/216.08 |
| 2007/0069553 | A1 | | 3/2007 | Yamada et al. | |
| 2009/0001772 | A1 | * | 1/2009 | Dosaki et al. | 296/216.09 |

FOREIGN PATENT DOCUMENTS

| JP | 2000-335255 A | 12/2000 |
| JP | 2004-098761 A | 4/2004 |

(Continued)

*Primary Examiner* — Dennis H Pedder
(74) *Attorney, Agent, or Firm* — McGinn IP Law Group, PLLC

(57) ABSTRACT

A roof weather strip capable of being readily attached to the motor vehicle with reduced costs. The roof weather strip adapted to effect a seal between a sliding panel and a fixed panel composing a vehicle roof, includes a base portion for attachment to an edge of a fixed base panel adapted to attach the fixed panel, and a seal portion for contacting the sliding panel. The base portion includes a panel engaging section for engagement with the edge of the fixed base panel, and a rim engaging section for engagement with a panel rim attached to the edge of the fixed panel. The panel engaging section is formed on the lower surface side of the base portion, and the rim engaging section is formed on the upper surface side of the base portion.

8 Claims, 4 Drawing Sheets

(56) References Cited

FOREIGN PATENT DOCUMENTS

| | | |
|---|---|---|
| JP | 2004-243901 A | 9/2004 |
| JP | 2004-243964 A | 9/2004 |
| JP | 2006-168588 A | 6/2006 |
| JP | 2007-090921 A | 4/2007 |
| JP | 2010-260394 A | 11/2010 |

* cited by examiner

ROOF WEATHER STRIP FOR MOTOR VEHICLE

CROSS-REFERENCE TO RELATED APPLICATION

This application is related to and claims priority from Japanese patent application No. 2012-067024, incorporated herein by reference.

BACKGROUND OF THE INVENTION

1. Field of the Invention

The present invention relates to a roof weather strip for a motor vehicle provided with a roof panel that is attached to cover a roof opening of a vehicle body, and includes a plurality of panels, at least one panel defining a sliding panel, which effects a seal between the sliding panel and its adjacent panels.

2. Description of Related Art

Conventionally, as shown in FIG. 1, a roof panel 10 adapted to open and close a roof opening 12 in a roof 14 of a motor vehicle is not divided, but normally composed of a single panel. As shown in FIG. 2, in order to effect a seal between the roof panel 10 and the roof opening 12, a sliding roof weather strip 16 is attached to a periphery of the roof panel 10. The sliding roof weather strip 16 includes a base portion 18 for attachment to the roof panel 10, and a tubular seal portion 20.

The tubular seal portion 20 is integrally formed with an exterior side wall of the base portion 18, and contacts the roof 14 around the roof opening 12. The base portion 18 has a holding part 22 adapted to hold an edge of the roof panel 10. With this arrangement, the roof opening 12 and the tubular seal portion 20 are sealed (Japanese Laid-open Patent Publication No. 2000-335255, ex.).

In this case, since the roof weather strip 16 is attached to the periphery of the roof panel 10, the appearance of an upper surface of the base portion 18 is required to be improved, and a transparent area of the roof panel 10 may become narrow. FIG. 2 is a partially cut away cross-section, taken along line B-B of FIG. 1.

Furthermore, in order to brighten a vehicle compartment, make a good airflow, improve a relaxed feeling and obtain a good view from the vehicle compartment, it has been demanded to enlarge the roof opening 12.

In this case, where the roof panel 10 is composed of a single panel, the dimensions and weight thereof increase, and when the single roof panel 10 slides upon opening of the roof opening 12, the sliding distance thereof becomes long. In addition, a driving mechanism for the roof panel 10 is less preferably enlarged, and the roof panel 10 may project rearwardly of the roof 14.

Under the above circumstances, as shown in FIG. 3, it has been tried to compose the roof panel 10 of a plurality of panels that are arranged in a longitudinal direction of the vehicle body. However, in this case, sealing is needed between adjacent panels.

Where the roof panel 10 is composed of three panels, a front-side panel 24 and a rear-side panel 26 are fixed, whereas a central panel 28 is made slidable (Japanese Laid-open Patent Publications Nos. 2004-243901 and 2006-168588, ex.).

In this case, as shown in FIGS. 3 and 4, a seal between the sliding panel 28 and the front-side panel 24 is effected by a front roof weather strip 30, whereas a seal along a side edge of the sliding panel 28 is effected by a side roof weather strips 32. And a seal between the sliding panel 28 and the rear-side panel 26 is effected by a rear roof weather strip 34. The front roof weather strip 30, the side roof weather strips 32 and the rear roof weather strip 34 define a sliding roof weather strip 36.

In one conventional example shown in FIG. 5, a rear roof weather strip 38 includes a first seal portion 40 contacting and sealing a lower surface of the sliding panel 28, a second seal portion 42 sealing a gap between the sliding panel 28 and the rear-side panel 26, and a base portion 44 holding the first seal portion 40 and the second seal portion 42. The base portion 44 is bonded to a panel rim 46 secured to an edge of the rear-side panel 26 with a double-sided adhesive tape 48 (Japanese Laid-open Patent Publication No. 2004-243964, ex.).

In another conventional example shown in FIG. 6, a front roof weather strip 50 includes a first seal portion 52 for sealing the sliding panel 28 and the front-side panel 24, a second seal portion 54 for contacting and sealing a lower surface of the sliding panel 28, and a base portion 56 for holding the first seal portion 52 and the second seal portion 54. The base portion 56 is bonded to a base panel 58 to which the front-side panel 24 is attached with double-sided adhesive tapes 60 (Japanese Laid-open Patent Publication No. 2010-260394, ex.).

In these roof weather strips shown in FIGS. 5 and 6, however, the base portions 44 and 56 are bonded to the base panel and the roof panel using the double-sided adhesive tapes 48 and 60 so that the number of parts increases, thereby increasing the working hours for mounting these parts on the vehicle body, and consequently increasing manufacturing costs, too.

SUMMARY OF THE INVENTION

Accordingly, it is an object of the present invention to provide a roof weather strip for a motor vehicle, which is capable of being readily attached while effecting a seal between a sliding panel and other panels composing a roof panel adapted to open and close a roof opening of a vehicle body, and consequently reducing manufacturing costs.

According to a first aspect of the invention, in a roof weather strip for a motor vehicle of which a roof has a roof panel composed of a plurality of panels arranged frontwardly and rearwardly of a vehicle body so as to cover an opening provided in the roof of the vehicle body, wherein at least one panel of the roof panel is a sliding panel that is slidable, at least another panel of the roof panel, which is located on a front side or a rear side of the sliding panel, is a fixed panel that is fixed to the roof, and the roof weather strip effects a seal between the sliding panel and the fixed panel, the roof weather strip has a base portion for attachment to an edge of a fixed base panel adapted to attach the fixed panel, and a seal portion adapted to contact the sliding panel. The base portion includes a panel engaging section for engagement with the edge of the fixed base panel, and a rim engaging section for engagement with a panel rim attached to an edge of the fixed panel. The panel engaging section is formed on a lower surface side of the base portion, and the rim engaging section is formed on an upper surface side of the base portion.

With the arrangement of the first aspect, the roof panel composed of a plurality of panels that are arranged frontwardly and rearwardly of the vehicle body is attached to the roof of the vehicle body so as to cover an opening provided in the roof of the vehicle body, and at least one panel of the roof panel is a sliding panel that is slidable. Therefore, if the opening provided in the roof of the vehicle body is enlarged, the dimensions of each panel of the plurality of panels can be decreased, as compared with the case where a single panel is used as the roof panel, and consequently, the opening of the roof of the vehicle body can be readily enlarged to brighten the interior of the vehicle compartment, make the view from the vehicle compartment fine, and much improve relaxed feeling. Since at least one panel of the roof panel is a sliding panel that is slidable, a driving mechanism for the roof panel can be made small and compact, as compared with all panels being slidable.

At least one panel of the roof panel, which is located on a front side or a rear side of the sliding panel, is a fixed panel that is fixed to the roof of the vehicle body, and the roof weather strip effects a seal between the sliding panel and the fixed panel. Therefore, the roof weather strip can securely effect a seal between the sliding panel and the fixed panel.

The roof weather strip has a base portion for attachment to an edge of a fixed base panel adapted to attach the fixed panel, and a seal portion adapted to contact the sliding panel. When the base portion is attached to the edge of the fixed base panel, the position of the seal portion can become stable so that the seal portion contacts the sliding panel and the fixed panel, thereby effecting a seal therebetween, The base portion includes a panel engaging section for engagement with the edge of the fixed base panel, and a rim engaging section for engagement with a panel rim attached to an edge of the fixed panel. Therefore, the edge of the base portion is engaged with the edge of the fixed base panel with the panel engaging section, whereas the rim engaging section on the fixed panel side of the base portion is engaged with the panel rim, whereby both ends of the base portion can be securely attached, and consequently, the base portion becomes stable, and the seal portion securely contacts facing parts so that a stable seal can be effected.

The panel engaging section is formed on a lower surface side of the base portion, and the rim engaging section is formed on an upper surface side of the base portion. With this arrangement, upon attaching of the base portion of the roof weather strip, the panel engaging section is first engaged with the edge of the fixed base panel, and then, the rim engaging section can be attached to the upper surface side of the fixed base panel, thereby facilitating the attaching work. And if the sliding panel is slid, the panel engaging section does not obstruct the sliding action thereof.

According to a second aspect of the invention, the fixed base panel has a downwardly recessed recess along the edge thereof, and defines a panel end on an end side of the recess, and the base portion on it's panel engaging section side contacts the panel end, whereas the base portion on its rim engaging section side contacts the fixed base panel on the panel rim side of the recess.

With the arrangement of the second aspect, since the fixed base panel has a downwardly recessed recess along an edge thereof, and defines a panel end on an end side of the recess, upon attaching of the roof weather strip, a space can be defined with the base portion and the recess, whereby when the sliding panel contacts the seal portion, the base portion can bend downwardly to absorb variations in the attaching state of the roof weather strip and ensure desired sealing properties.

The base portion on its panel engaging section side contacts the panel end, whereas the base portion on its rim engaging section side contacts the fixed base panel on the panel rim side of the recess. Therefore, the central part of the base portion can bend downwardly, whereas both ends of the base portion can effect a seal between the fixed base panel and the roof weather strip, thereby ensuring sealing properties.

According to a third aspect of the invention, the base portion on its rim engaging section side contacts the panel rim.

With this arrangement, since the base portion on its rim engaging section side contacts the panel rim and the fixed base panel with sandwiched therebetween, the roof weather strip can be stably held.

According to a fourth aspect of the invention, the base portion on its rim engaging section side has a contacting lip for contacting the panel rim attached with the fixed base panel.

With this arrangement, since the base portion on its rim engaging section side has a contacting lip adapted to contact the panel rim attached with the fixed base panel, the sealing properties between the roof weather strip and the fixed panel or the panel rim can be improved with the contacting lip along with the rim engaging section.

According to a fifth aspect of the invention, the seal portion includes a tubular seal portion and a seal lip, the tubular seal portion is located between the sliding panel and the fixed panel, and contacts the sliding panel and the fixed panel, and the seal lip contacts a lower surface of the sliding panel on a center side of an edge thereof.

With this arrangement, since the seal portion includes a tubular seal portion and a seal lip, the lower surface of the sliding panel can be doubly sealed.

Since the tubular seal portion is located between the sliding panel and the fixed panel, and contacts the sliding panel and the fixed panel, the contacting area is large so that if the gap between the sliding panel and the fixed panel varies, it can be securely sealed.

Since the seal lip contacts a lower surface of the sliding panel on a center side of an edge thereof, an upper half of the seal lip readily bends to contact the lower surface of the sliding panel flexibly and seal the same.

According to a sixth aspect of the invention, the tubular seal portion and the seal lip are composed of a sponge material, and the base portion is composed of a solid material.

With this arrangement, since the tubular seal portion and the seal lip are composed of a sponge material, they can flexibly bend to conform to the configuration of the lower surface of the sliding panel and can contribute to the reduction in weight of the roof weather strip. Since the base portion is composed of a solid material, it exhibits rigidity so that when the sliding panel slides to deform the tubular seal portion and the seal lip, the deformation of the base portion decreases, whereby the base portion can be securely attached to the fixed panel and the panel rim, and consequently, the tubular seal portion and the seal lip can contact the sliding panel stably.

According to a seventh aspect of the invention, the base portion further includes an attaching leg adapted to contact the recess of the fixed base panel.

With this arrangement, since the base portion further includes an attaching leg adapted to contact the recess of the fixed base panel, if the base portion bends downwardly, the attaching leg flexibly bends to prevent an excessive deformation of the base portion, and consequently, sealing properties can be ensured.

With this arrangement, the fixed panel is a rear panel on the rear side of the sliding panel, and is attached to a front edge of the rear panel. Therefore, when the roof weather strip is attached to the rear fixed panel, and the sliding panel is slid, a gap between the sliding panel and the fixed panel on the rear side of the sliding panel can be securely sealed.

Since the base portion has the panel engaging section for engagement with the edge of the fixed base panel, and the rim engaging section for engagement with the panel rim attached to the edge of the fixed panel, the edge of the base portion is engaged with the edge of the fixed base panel with the panel engaging section, whereas the rim engaging section of the base portion on its fixed panel side is engaged with the panel rim, whereby both ends of the base portion can be securely attached.

Since the panel engaging section is formed on the lower surface side of the base portion, and the rim engaging section is formed on the upper surface side of the base portion, the panel engaging section is first engaged with the edge of the fixed base panel, and then, the rim engaging section can be attached to the upper surface of the fixed base panel, thereby facilitating the attaching work.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
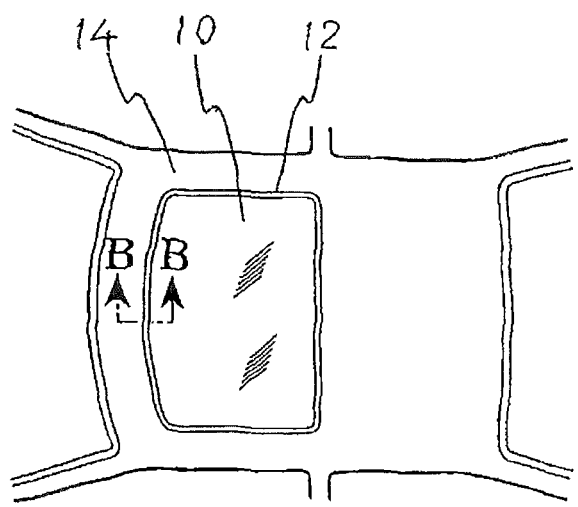
FIG. 1 is a plan view of a roof of a motor vehicle.
Figure 2:
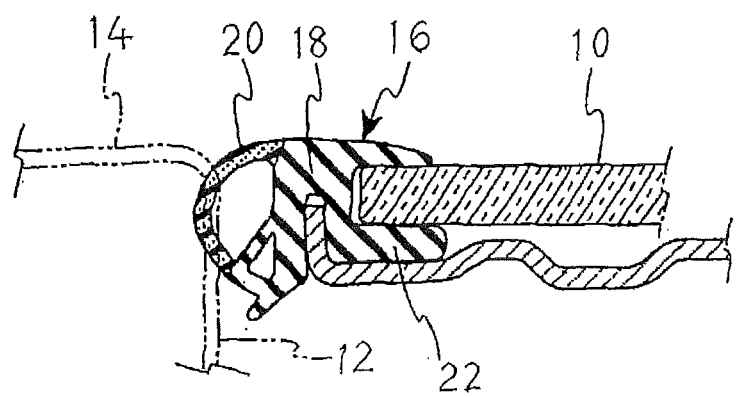
FIG. 2 is a partially cut-away cross-sectional view taken along line B-B of FIG. 1, which shows the attaching state of a conventional sliding roof weather strip.

Hereinafter, one embodiment of the present invention will be explained with reference to FIGS. 3 and 7, based on a rear roof weather strip 62 of a roof weather strip 64, which is adapted to seal a gap between a front edge of a third roof panel 66 as a rear-side fixed panel of a roof panel 68 composed of three panels, and a rear edge of a sliding panel 70 positioned at a middle position of the roof panel 68. The present invention can be also applied to other sealing structures using a front roof weather strip 72 adapted to seal a gap between a front edge of the sliding panel 70 and a rear edge of a first panel 74 as a front-side fixed panel, and weather strips adapted to seal gaps between divided two sliding panels and another fixed panel.

Figure 3:
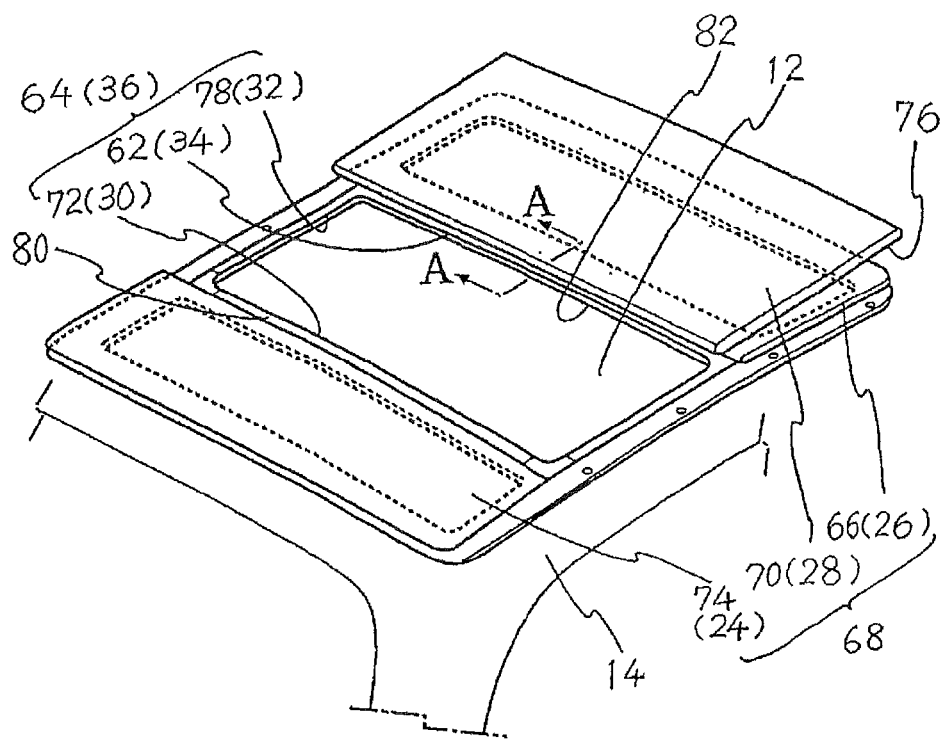
FIG. 3 is a perspective view of the attaching state of a roof weather strip around a roof opening of a vehicle body when a sliding roof panel is opened, which is seen from the obliquely upper side of the sliding roof panel.
Figure 4:
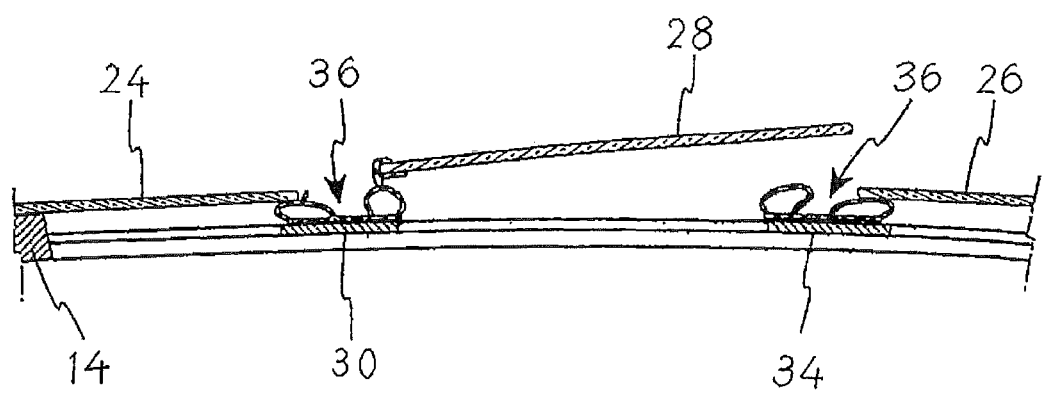
FIG. 4 is a cross-sectional view of a roof panel, which shows the state just before a conventional sliding roof is closed.
Figure 5:
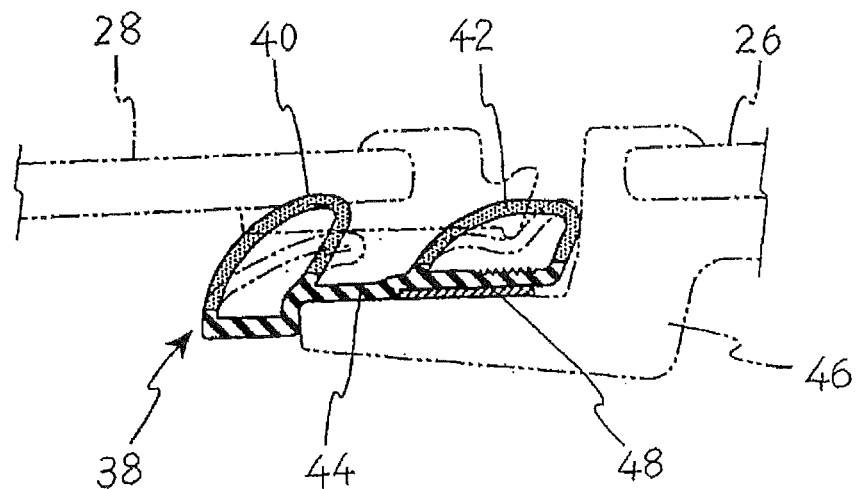
FIG. 5 is a cross-sectional view showing the attaching state of another sliding roof weather strip adapted to seal a gap between a conventional sliding roof and a rear-side fixed panel.
Figure 6:
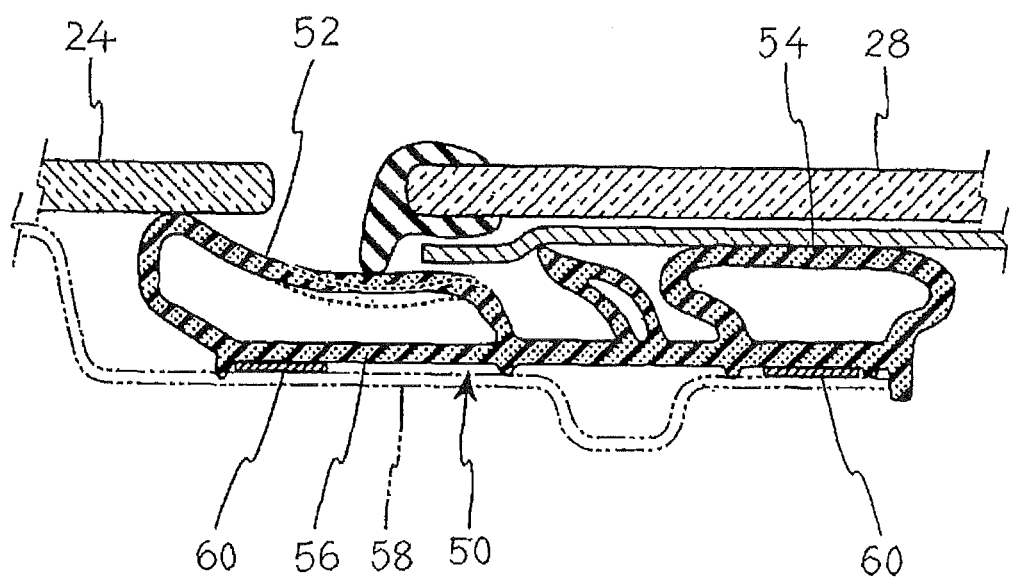
FIG. 6 is a cross-sectional view showing the attaching state of still another sliding roof weather strip adapted to seal a gap between a conventional sliding roof and a front-side fixed panel.

FIG. 3 is a perspective view showing the attaching state of the roof panel 68 composed of three panels to the roof opening 12 of the roof 14 so as to cover the same. The roof panel 68 is composed of the first panel 74 as a front-side fixed panel, the sliding panel 70 as a slidable second panel, and the third panel 66 as a fixed panel. In FIG. 3, the sliding panel 70 is in the rearwardly sliding state.

Figure 7:
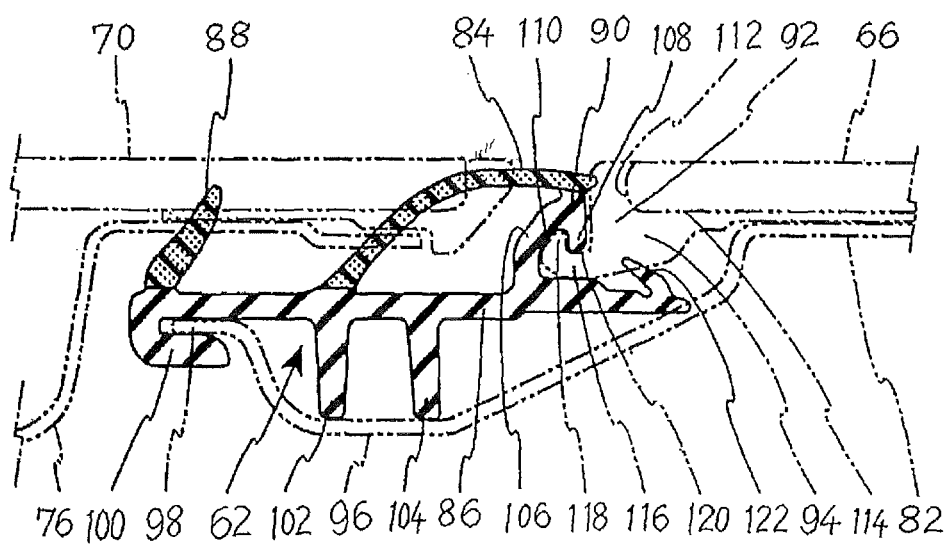
FIG. 7 is a partially cut-away cross-sectional view taken along line A-A of FIG. 3, which shows a rear roof weather strip in one embodiment of a roof weather strip in accordance with the present invention.

As shown in FIG. 7, a periphery of the sliding panel 70 is held with a second base panel 76, and the sliding panel 70 slides integrally with the second base panel 76.

The roof weather strip 64 is formed into an annular configuration, and an upper surface of the roof weather strip 64 contacts a lower surface of the sliding panel 70 or the second base panel 76 holding the sliding panel 70 along a periphery thereof. The roof weather strip 64 includes the front roof weather strip 72, the rear roof weather strip 62 and a side roof weather strip 78.

The front roof weather strip 72 is arranged between the first panel 74 and the sliding panel 70, whereas the rear roof weather strip 62 is arranged between the sliding panel 70 and the third panel 66. The side roof weather strip 78 is arranged between each of both side edges of the sliding panel 70 and each of both side edges defining the roof opening 12. The side roof weather strip 78 has a single tubular seal portion, as is different from the front roof weather strip 72 and the rear roof weather strip 62, each having two tubular seal portions.

The front roof weather strip 72, the rear roof weather strip 62 and the side roof weather strip 78 can be joined to each other by molding to conform to corners of the roof opening 12 so as to extend in a ring-shaped configuration around the roof opening. With this arrangement, the entire circumference of the sliding panel 70 inclusive of its corners can be sealed.

A sealant, dam, etc. (not shown) are attached between the second base panel 76 and the sliding panel 70 to provide a secure seal therebetween. The tubular seal portion of the side roof weather strip 78 is communicated with the tubular seal portion of a second weather strip section of the front roof weather strip 72, and the tubular seal portion of a second weather strip section of the rear roof weather strip 62, respectively, to define a ring-shaped tubular seal portion.

A base member has three openings corresponding to the three panels of the roof panel 68.

As shown in FIG. 3, the base member includes a first base panel 80 corresponding to an opening facing the first panel 74, the second base panel 76 corresponding to an opening facing the sliding panel 70, and a third base panel 82 corresponding to an opening facing the third panel 66.

The first panel 74 is attached to the first base panel 80 so as to cover the opening facing the first panel 74, and a rear edge thereof contacts the seal portion of the front roof weather strip 72.

The third panel 66 is attached to the third base panel 82 so as to cover the opening facing the third panel 66, and a front edge thereof contacts a second seal portion 84 of the rear roof weather strip 62.

First, the configuration of the rear roof weather strip 62 will be explained with reference to FIG. 7. The front roof weather strip 72 exhibits similar operation to the rear roof weather strip 62 so that the rear roof weather strip 62 will be mainly explained.

The rear roof weather strip 62 is formed by extrusion into a generally straight configuration, and extends in a longitudinal direction thereof. The rear roof weather strip 62 has a seal portion and a base portion 86. The seal portion includes the second seal portion 84 located between the sliding panel 70 and the third panel 66 as a fixed panel for contacting and sealing both the rear edge of the sliding panel 70 and the front edge of the third panel 66, and a first seal portion 88 located slightly frontward of the rear edge of the sliding panel 70 for contacting and sealing a lower surface of the sliding panel 70 or the second base panel 76 adapted to hold the sliding panel 70. The first seal portion 88 and the second seal portion 84 is integrally joined to each other with the base portion 86.

As shown in FIG. 7, the first seal portion 88 as a seal lip is composed of a sponge material, and has a lip-like configuration so as to exhibit flexibility. Consequently, it contacts a lower surface of the sliding panel 70 slightly frontwardly of a rear edge thereof to flexibly contact and seal the lower surface of the sliding panel 70 in conformity with the configuration thereof.

The second seal portion 84 as a tubular seal portion is composed of a sponge material, has an arc-shaped configuration and is connected to an edge of a rim engaging section 90 extending from the base portion 86 to define the tubular seal portion. Since the rim engaging section 90 is composed of a solid material, it can hold the arc-shaped second seal portion 84. Since the second seal portion 84 contacts both the sliding panel 70 and the third panel 66 as a fixed panel with a curving wide area, it can securely seal them, even if a gap between the sliding panel 70 and the third panel 66 varies. A rear end of the second seal portion 84 contacts a rim main body 92 of a panel rim 94 to provide a seal between the panel rim 94 and the rear roof weather strip 62.

Next the base portion 86 will be explained.

As shown in FIG. 7, the base portion 86 is formed into a plate-shaped configuration. The first seal portion 88 is formed on a front side of the upper surface thereof, whereas the second seal portion 84 is formed on a rear side thereof. The first seal portion 88 and the second seal portion 84, which are held with the base portion 86, can effect a double seal against the lower surface of the sliding panel 70.

The base portion 86 is secured to an edge of the third base panel 82 secured to a lower surface of the third panel 66 as a rear-side fixed panel for holding the third panel 66. The third base panel 82 has a downwardly recessed recess 96 slightly rearwardly of an edge 98 of the third base panel 82. When the rear roof weather strip 62 is attached to the third base panel 82, the recess 96 can define a space between the base portion 86 and the third base panel 82, and consequently, when the sliding panel 70 contacts the second seal portion 84, the base portion 86 can bend downwardly to absorb variations in the assembling state of the sliding panel 70 and the third base panel 82, whereby a desired sealing properties can be ensured while ensuring contacting of the first seal portion 88 and the second seal portion 84 against the sliding panel 70.

A panel engaging section 100 is provided along a front edge of the base portion 86 so as to curve like a hairpin downwardly of the base portion 86. More specifically, the panel engaging section 100 protrudes from the lower surface of the base portion 86 downwardly, and extends rearwardly to define a space therein. The edge 98 of the third base panel 82 is inserted in the space of the panel engaging section 100, whereby a front edge of the base portion 86 is attached. With this arrangement, when the sliding panel 70 contacts the first seal portion 88 and the second seal portion 84, the base portion 86 is securely held without slipping.

A first leg 102 and a second leg 104 adapted to contact the recess 96 of the third base panel 82 as a fixed base panel protrude from the lower surface of the base portion 86. In the present embodiment, two legs are provided, but alternatively, one leg or three or more legs may be provided. When the sliding panel 70 contacts the first seal portion 88 and the second seal portion 84, the first leg 102 and the second leg 104 bend to prevent the base portion 86 from excessively deforming downwardly, because the first leg 102 and the second leg 104 contact the recess 96 of the third base panel 82. As a result, the first seal portion 88 and the second seal portion 84 contact the sliding panel 70 to securely exhibit sealing properties.

The rim engaging section 90 is provided along a rear edge of the base portion 86 on an upper surface thereof with a hook-shaped configuration. The rim engaging section 90 includes an engaging wall 106 extending from the base portion 86 upwardly while curving rearwardly, an engaging end 108 extending from an edge of the engaging wall 106 downwardly, and an engaging recess 110 that is defined by the engaging wall 106 and the engaging end 108 and opens rearwardly.

An edge of the panel rim 94 adapted to be attached to the front edge of the third base panel 82 is engaged in this recess 110. As shown in FIG. 7, the panel rim 94 is attached to the third panel 66 in a rim rear surface 112 adapted to contact an edge of the third panel 66, and a rim attaching surface 114 adapted to contact a lower surface of the third panel 66. A rim hook 116 is provided in a lower part of the rim main body 92 that is formed into a plate-shaped configuration along the edge of the third base panel 82. An edge of the rim hook 116 bends upwardly to define a rim end 118. The panel rim 94 can be composed of a synthetic resin, a hard rubber, etc.

After the panel engaging section 100 of the base portion 86 is attached to the edge 98 of the third base panel 82, the rim hook 116 is engaged with the rim engaging section 90. More specifically, the rim end 118 is engaged in an interior space of the engaging recess 110 of the rim engaging section 90, whereas the engaging end 108 of the rim engaging section 90 is engaged in a rim recess 120 defined by the rim hook 116 of the panel rim 94 and the rim end 118.

With this arrangement, edges of the base portion 86 can be securely held with the panel engaging section 100 and the rim engaging section 90 without using double-sided adhesive tapes, and a seal between the third base panel 82 and the rear roof weather strip 62 can be effected with the panel engaging section 100 and the rim engaging section 90, whereby sealing properties can be ensured.

In addition, by engaging the panel engaging section 100 and the rim engaging section 90 with the third base panel 82 and the panel rim 94, the base portion 86 can be attached to the third base panel 82 and the panel rim 94, thereby facilitating the attaching work thereof.

A contacting lip 122 may be formed on an upper surface of the base portion 86 rearwardly of the panel engaging section 100. In this case, the contacting lip 122 is formed on the upper surface of the base portion 86, and contacts the third roof panel 66 or the panel rim 94. With this arrangement, the sealing properties between the rear roof weather strip 62 and the third base panel 66 or the panel rim 94 can be doubly ensured.

The roof weather strips 64 are formed by extruding synthetic rubbers such as EPDM rubber or a thermoplastic elastomer. In the present embodiment, the first seal portion 88 and the second seal portion 84 of the roof weather strip 64 are composed of a sponge material, whereas the base portion 86 is composed of a solid material. In the case of synthetic rubbers, after the extruding step, vulcanization is carried out in a vulcanizing chamber using heated air or high frequency. Then, vulcanized bodies are cut to have a predetermined length, respectively, for producing products.

The front roof weather strip 72, the side roof weather strips 78 and the rear weather strip 62, each being subjected to extrusion, vulcanization and cutting work, may be used, but, these weather strips may be formed into a ring-shaped configuration by molding end portions of these weather strips to conform to corners of the third base panel 82.

The present embodiment has been explained with reference to the rear roof weather strip 62 adapted to provide a seal between the rear edge of the sliding panel 70 and the front edge of the third panel 66, but the present invention is applicable to the front roof weather strip 72 adapted to provide a seal between the front edge of the sliding panel 70 and the rear edge of the first panel 74.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A roof weather strip for a motor vehicle, of which a roof includes a roof panel including a plurality of panels arranged frontwardly and rearwardly of a vehicle body so as to cover an opening provided in the roof of the vehicle body, wherein at least one panel of the roof panel comprises a sliding panel that is slidable, at least another panel of the roof panel, which is located on one of a front side and a rear side of the sliding panel, comprises a fixed panel that is fixed to the roof, and the roof weather strip effects a seal between the sliding panel and the fixed panel, said roof weather strip comprising:
   a base portion for attachment to an edge of a fixed base panel adapted to attach the fixed panel; and
   a seal portion for contacting the sliding panel,
   wherein said base portion includes a panel engaging section for engagement with said edge of said fixed base panel, and a rim engaging section for engagement with a panel rim attached to an edge of the fixed panel,
   wherein said panel engaging section is formed on a lower surface side of said base portion,
   wherein said rim engaging section is formed on an upper surface side of said base portion,
   wherein said fixed base panel has a downwardly recessed recess along said edge thereof, and defines a panel end on an end side of said recess,
   wherein said base portion on a panel engaging section contacts said panel end, and
   wherein said base portion on a rim engaging section side contacts said fixed base panel on a panel rim side of said recess.

2. The roof weather strip as claimed in claim 1, wherein said base portion on a rim engaging section side contacts said panel rim.

3. The roof weather strip as claimed in claim 1, wherein said base portion on a rim engaging section side has a contacting lip adapted to contact said panel rim attached to said fixed panel.

4. A roof weather strip for a motor vehicle, of which a roof includes a roof panel including a plurality of panels arranged frontwardly and rearwardly of a vehicle body so as to cover an opening provided in the roof of the vehicle body, wherein at least one panel of the roof panel comprises a sliding panel that is slidable, at least another panel of the roof panel, which is located on one of a front side and a rear side of the sliding panel, comprises a fixed panel that is fixed to the roof, and the roof weather strip effects a seal between the sliding panel and the fixed panel, said roof weather strip comprising:
   a base portion for attachment to an edge of a fixed base panel adapted to attach the fixed panel; and
   a seal portion for contacting the sliding panel, wherein said base portion includes a panel engaging section for engagement with said edge of said fixed base panel, and a rim engaging section for engagement with a panel rim attached to an edge of the fixed panel,
   wherein said panel engaging section is formed on a lower surface side of said base portion,
   wherein said rim engaging section is formed on an upper surface side of said base portion,
   wherein said seal portion includes a tubular seal portion and a seal lip,
   wherein said tubular seal portion is located between said sliding panel and said fixed panel, and contacts said sliding panel and said fixed panel, and
   wherein said seal lip contacts a lower surface of said sliding panel.

5. The roof weather strip as claimed in claim 4, wherein said tubular seal portion and said seal lip comprise a sponge material, and
   said base portion comprises a solid material.

6. The roof weather strip as claimed in claim 1, wherein said base portion further includes an attaching leg on said lower surface side, which is adapted to contact said recess of said fixed base panel.

7. The roof weather strip as claimed in claim 1, wherein said fixed panel comprises a rear panel on the rear side of said sliding panel, and said seal portion is attached to a front edge of said rear panel.

8. The roof weather strip as claimed in claim 4, wherein said seal lip contacts the lower surface of said sliding panel frontwardly of a rear edge.

* * * * *